United States Patent
Lutz et al.

(10) Patent No.: US 10,140,093 B2
(45) Date of Patent: Nov. 27, 2018

(54) APPARATUS AND METHOD FOR ESTIMATING A SHIFT AMOUNT WHEN PERFORMING FLOATING-POINT SUBTRACTION

(71) Applicant: ARM Limited, Cambridge (GB)

(72) Inventors: David Raymond Lutz, Austin, TX (US); Ian Michael Caulfield, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/473,841

(22) Filed: Mar. 30, 2017

(65) Prior Publication Data
US 2018/0285076 A1    Oct. 4, 2018

(51) Int. Cl.
*G06F 7/485*    (2006.01)
*G06F 5/01*    (2006.01)
(52) U.S. Cl.
CPC .............. *G06F 7/485* (2013.01); *G06F 5/012* (2013.01)
(58) Field of Classification Search
None
See application file for complete search history.

(56) References Cited

U.S. PATENT DOCUMENTS 5,923,577 A * 7/1999 Wong ........................ G06F 1/035
                                                   708/501
5,940,311 A * 8/1999 Dao ........................... G06F 5/00
                                                   708/204
5,943,249 A   8/1999 Handlogten (Continued)

OTHER PUBLICATIONS

Muller et al., *Handbook of Floating-Point Arithmetic*, Published in 2010, pp. 291-295.

(Continued)

*Primary Examiner* — Michael D. Yaary
(74) *Attorney, Agent, or Firm* — Nixon & Vanderhye P.C.

(57) ABSTRACT

An apparatus and method are provided for estimating a shift amount when employing processing circuitry to perform a subtraction operation to subtract a second significand value of a second floating-point operand from a first significand value of a first floating-point operand in order to generate a difference value. Shift estimation circuitry then determines an estimated shift amount to be applied to the difference value. The shift estimation circuitry comprises significand analysis circuitry to generate, from analysis of the significand values of the two floating-point operands, a first bit string identifying a most significant bit position within the difference value that is predicted to have its bit set to a determined value. In parallel, shift limiting circuitry generates from an exponent value a second bit string identifying a shift limit bit position. The shift limiting circuitry has computation circuitry to perform, for each bit position in at least a subset of bit positions of the second bit string, an associated computation using bits of the exponent value to determine a value for that bit position within the second bit string. The associated computation is different for different bit positions. Combining circuitry then generates a combined bit string from the first and second bit strings, and shift determination circuitry determines the estimated shift amount from the combined bit string.

19 Claims, 4 Drawing Sheets

(56) References Cited

U.S. PATENT DOCUMENTS

| | | | | |
|---|---|---|---|---|
| 6,085,211 | A * | 7/2000 | Yoshioka | G06F 7/485 708/205 |
| 6,405,232 | B1 * | 6/2002 | Green | G06F 5/012 708/505 |
| 2009/0172054 | A1 * | 7/2009 | Rarick | G06F 7/74 708/211 |
| 2010/0042665 | A1 | 2/2010 | Ahmed | |
| 2012/0215823 | A1 | 8/2012 | Lutz | |
| 2014/0136587 | A1 | 5/2014 | Goveas et al. | |
| 2015/0142864 | A1 | 5/2015 | Quinnell | |

OTHER PUBLICATIONS

Combined Search and Examination Report dated Aug. 3, 2018 in GB Application 1802120.4, 9 pages. H. He et al, "Multiply-Add Fused Float Point Unit with On-fly Denormalized No. Processing" 48$^{th}$ Midwest Symposium on Circuits and Systems, Aug. 7-10, 2005, pp. 1466-1468.

* cited by examiner

EXAMPLE OF CONSTRUCT LIM BLOCK FOR SIMPLE CASE
WHERE THERE IS A 6-BIT DIFFERENCE VALUE
AND A 5-BIT EXPONENT VALUE

```
exp_ge_8 = exp[4] | exp[3];

lim[7] = ~exp_ge_8 & ~exp[2] & ~exp[1];              // no shifting lim[6] = ~exp_ge_8 & ~exp[2] & ~exp[1] & ~exp[0];    // 1-bit shift OK lim[5] = ~exp_ge_8 & ~exp[2] & ~exp[1] &  exp[0];    // 2-bit shift OK lim[4] = ~exp_ge_8 & ~exp[2] &  exp[1] & ~exp[0];    // 3-bit shift OK lim[3] = ~exp_ge_8 & ~exp[2] &  exp[1] &  exp[0];    // 4-bit shift OK lim[2] = ~exp_ge_8 &  exp[2] & ~exp[1] & ~exp[0];    // 5-bit shift OK lim[1] = ~exp_ge_8 &  exp[2] & ~exp[1] &  exp[0];    // 6-bit shift OK lim[0] = 0; // don't care, never used as a limit for a 6-bit difference
```

FIG. 4

APPARATUS AND METHOD FOR ESTIMATING A SHIFT AMOUNT WHEN PERFORMING FLOATING-POINT SUBTRACTION

BACKGROUND

The present technique relates to an apparatus and method for estimating a shift amount when performing floating-point subtraction.

It is common to use floating-point (FP) representation in data processing systems. A floating-point number includes a significand and an exponent indicating a significance of the bits of the significand. A normalised floating-point number has a significand of at least 1 and less than 2, and hence has the format 1.xxxxx. When subtracting one floating-point number from another, the result can be a very small number, i.e. there can be a large number of leading zeros. In order to seek to renormalize the significand of the result, a left shift operation can be performed on the difference value obtained by subtracting one significand from the other significand.

It is known to use leading-zero anticipator circuitry (an LZA circuit) to seek to predict how many leading zeros there will be in the difference value, based on an analysis of the significands, with that leading zero information being used to determine a left shift to apply to the difference value in order to seek to normalise the difference.

However, normalisation for numbers less than 1.0 requires that the exponent be decremented to compensate for the adjustment being made to the difference value. Exponent decrementing becomes a problem when the exponent is already small, because FP numbers cannot have a true exponent below a predetermined minimum value. Accordingly, any proposed left shift produced by the LZA needs to be qualified, so that a left shift will not be applied that results in the exponent being decremented below the minimum value.

It would be desirable to provide an efficient mechanism for performing such qualification of the shift amount produced using circuits such as LZA circuitry.

SUMMARY

In one example arrangement, there is provided an apparatus comprising: processing circuitry to perform a subtraction operation to subtract a second significand value of a second floating-point operand from a first significand value of a first floating-point operand in order to generate a difference value; and shift estimation circuitry to determine an estimated shift amount to be applied to the difference value, the shift estimation circuitry comprising: significand analysis circuitry to generate, from analysis of the first and second significand values, a first bit string identifying a most significant bit position within the difference value that is predicted to have its bit set to a determined value; shift limiting circuitry to generate from an exponent value a second bit string identifying a shift limit bit position, the shift limiting circuitry having computation circuitry to perform, for each bit position in at least a subset of bit positions of the second bit string, an associated computation using bits of the exponent value to determine a value for that bit position within the second bit string, the associated computation being different for different bit positions; combining circuitry to generate a combined bit string from the first and second bit strings; and shift determination circuitry to determine the estimated shift amount from the combined bit string.

In another example arrangement there is provided a method of determining an estimated shift amount when employing processing circuitry to perform a subtraction operation to subtract a second significand value of a second floating-point operand from a first significand value of a first floating-point operand in order to generate a difference value, the estimated shift amount then being applied to the difference value, the method comprising: generating, from analysis of the first and second significand values, a first bit string identifying a most significant bit position within the difference value that is predicted to have its bit set to a determined value; generating from an exponent value a second bit string identifying a shift limit bit position, by employing computation circuitry to perform, for each bit position in at least a subset of bit positions of the second bit string, an associated computation using bits of the exponent value to determine a value for that bit position within the second bit string, the associated computation being different for different bit positions; generating a combined bit string from the first and second bit strings; and determining the estimated shift amount from the combined bit string.

In a yet further example configuration, there is provided an apparatus comprising: processing means for performing a subtraction operation to subtract a second significand value of a second floating-point operand from a first significand value of a first floating-point operand in order to generate a difference value; and shift estimation means for determining an estimated shift amount to be applied to the difference value, the shift estimation means comprising: significand analysis means for generating, from analysis of the first and second significand values, a first bit string identifying a most significant bit position within the difference value that is predicted to have its bit set to a determined value; shift limiting means for generating from an exponent value a second bit string identifying a shift limit bit position, the shift limiting means having computation means for performing, for each bit position in at least a subset of bit positions of the second bit string, an associated computation using bits of the exponent value to determine a value for that bit position within the second bit string, the associated computation being different for different bit positions; combining means for generating a combined bit string from the first and second bit strings; and shift determination means for determining the estimated shift amount from the combined bit string.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

In one embodiment an apparatus is provided that has processing circuitry for performing a subtraction operation on first and second floating-point operands. In one embodiment, prior to the subtraction operation being performed, the first and second floating-point operands are arranged to have an exponent value that is the same, and to have associated first and second significand values respectively. During performance of the subtraction operation, the processing circuitry is then arranged to subtract the second significand value from the first significand value to generate a difference value.

Further, shift estimation circuitry is used to determine an estimated shift amount to be applied to the difference value. The shift estimation circuitry comprises significand analysis circuitry to generate, from analysis of the first and second significand values, a first bit string identifying a most significant bit position within the difference value that is predicted to have its bit set to a determined value. It should be noted that the significand analysis circuitry performs its analysis using the first and second significand values, and typically operates prior to the difference value being computed. Accordingly, the most significant bit position that is identified is a prediction. The significand analysis circuitry can be formed in a variety of ways, but in one embodiment uses known leading zero anticipator (LZA) components, which can predict the most significant bit position with high accuracy. In one particular embodiment, the prediction will at most be out by one bit position, due to the potential for a carry-out from low order bits.

However, rather than using the first bit string directly to determine the estimated shift amount, in accordance with the described techniques a combined bit string is first generated by combining the first bit string produced by the significand analysis circuitry with a second bit string. In particular, in the described embodiments shift limiting circuitry is also provided as part of the shift estimation circuitry to generate from the exponent value a second bit string identifying a shift limit bit position. The shift limiting circuitry has computation circuitry to perform, for each bit position in at least a subset of bit positions of the second bit string, an associated computation using bits of the exponent value to determine a value for that bit position within the second bit string. The associated computation is different for different bit positions. It has been found that by arranging the computation circuitry to operate in the above manner, directly using as inputs the bits of the exponent value, a second bit string can be generated relatively quickly, and in one embodiment can be generated in parallel with the generation of the first bit string.

Combining circuitry is then used to generate a combined bit string from the first and second bit strings, whereafter shift determination circuitry determines the estimated shift amount from the combined bit string.

Such an approach provides a very efficient mechanism for qualifying the information contained within the first bit string produced by the significand analysis circuitry, so as to ensure that a left shift is not applied that would cause the exponent to require adjustment beyond a minimum allowed exponent value. Because the shift limiting circuitry performs associated computations for each bit position within said at least a subset of bit positions of the second bit string using directly the bits of the exponent value, there is no need to seek to compute a difference between the exponent value and the minimum allowed exponent value, allowing the qualification of the left shift amount to be performed very efficiently.

In one embodiment said at least a subset of bit positions comprises a number of bit positions at least equal to the number of bit positions in the difference value. Hence, for each possible shift amount to be applied to the difference value a computation will be performed by the shift limiting circuitry to determine a value for a corresponding bit position with the second bit string. Whilst in one embodiment the second bit string may only comprise the same number of bits as the difference value, it may in some embodiments be easier to operate on values whose number of bits are a power of two, and hence the second bit string (and indeed the first bit string) may be padded with predetermined values (for example logic 0 values) in a certain number of least significant bit positions. By way of particular example, when handling the subtraction of double precision floating-point products and/or values, a 106-bit difference value may be generated, and each of the first and second bit strings may be extended from 106-bit values to 128-bit values by appending 22 least significant bits all set to zero.

The associated computation for each bit position within said at least a subset of bit positions of the second bit string can take a variety of forms, but in some embodiments is at least logically equivalent to a computation that uses each bit of the exponent value at most once. In one embodiment the computation for each bit position does in fact use each bit of the exponent value at most once. In one particular embodiment, for all bit positions in said at least a subset other than a most significant bit position, the associated computation uses each bit of the exponent value once, but for a most significant bit position all bits of the exponent value other than a least significant bit are used once.

The associated computation itself can take a variety of forms, but in one embodiment the associated computation for each bit position in said at least a subset of bit positions of the second bit string performs a sequence of logical operations on the bits of the exponent value. As used herein, logical operations are operations that act on binary numbers that produce a result according to the laws of Boolean logic. In one particular embodiment, the sequence of logical operations comprise one or more of AND, OR and NOT operations.

In one embodiment, the significand analysis circuitry and the shift limiting circuitry are arranged to operate in parallel, so that the second bit string is produced without impacting on the overall performance of the determination of the estimated shift amount.

In one particular embodiment, the shift limiting circuitry has a logic depth no greater than the logic depth of the significand analysis circuitry, and as such the operation of the shift limiting circuitry does not introduce any delay into the determination of the estimated shift amount. Accordingly, the only delay introduced is that involved in generating the combined bit string then used by the shift determination circuitry, but in one embodiment the generation of the combined bit string can be implemented using a single 2-input OR gate function, hence introducing very minimal delay. This hence provides a very efficient mechanism for qualifying the left shift amount to take account of the allowable maximum adjustment to the exponent value.

In one embodiment, the significand analysis circuitry is arranged to generate the first bit string such that a bit position within the first bit string is set to a first value to identify said most significant bit position; the shift limiting circuitry is arranged to generate the second bit string such that a bit position within the second bit string is set to the first value to identify the shift limit bit position; and the shift determination circuitry is arranged to determine the estimated shift amount by detecting a number of leading bit positions within the combined bit string that are set to a second value different to said first value.

The shift limiting circuitry can be arranged to operate in a variety of ways, but in one embodiment generates the second bit string such that at most one bit position within the second bit string is set to the first value. Accordingly, if one bit position is set to the first value, this will indicate the shift limit bit position, and if no bit positions are set to the first value, this will indicate that there is no limit on the shift required due to the exponent value. In particular, in that scenario it will have been evaluated that the exponent value is large enough that the adjusted exponent value will still be within the allowable range even if a maximum left shift is applied having regard to the number of bits contained within the difference value.

The combining circuitry can operate in a variety of ways, but in one embodiment performs a logical OR operation on the first and second bit strings to generate the combined bit string.

In one embodiment, the first value is a logic 1 value and the second value is a logic 0 value. It will be appreciated in an alternative embodiment these values could be flipped if desired.

Further, in one embodiment the determined value is a logic one value. Accordingly, the significand analysis circuitry identifies a most significant bit position within the difference value that is predicted to have its bit set to a logic one value. In an alternative embodiment, the determined value may be a logic 0 value, if the numbers being manipulated are represented in an appropriate manner.

The computation circuitry can be arranged in a variety of ways. However, in one embodiment the computation circuitry includes no limit detection circuitry to set a no limit flag when the exponent value is large enough to allow it to be adjusted by an amount sufficient to compensate for a maximum possible shift amount for the difference value. The computation circuitry is arranged, when the no limit flag is set, to generate a default bit sequence for the second bit string that identifies absence of the shift limit bit position. This provides an efficient mechanism for detecting when the exponent value does not require any limit to be placed on the estimated shift amount that would be directly determined by the first bit string.

The no limit detection circuitry can be organised in a variety of ways, but in one embodiment performs a logical OR operation on a number of most significant bits of the exponent value, the number of most significant bits being dependent on a number of bits used to specify the exponent value and the maximum possible shift amount. In particular, if the exponent value is expressed using a sufficient number of bits that it can encode values that are large enough that an adjusted exponent value that takes into account the maximum possible shift applied to the difference value will still be within the allowable range, and if any of the relevant most significant bits of the exponent value are set to identify that the exponent value is in fact at least large enough for the above condition to be true, then presence of any of those bits being set will cause the no limit flag to be set.

The default bit sequence generated in the presence of the no limit flag being set can take a variety of forms, but in one embodiment is an all zeros bit sequence.

In one embodiment, the computation circuitry is arranged to set a most significant bit position in the second bit string to identify the shift limit bit position when the exponent value is one of a minimum exponent value for a normal floating-point value and a reserved exponent value used for a subnormal floating-point value, setting of the most significant bit position in the second bit string causing the shift determination circuitry to determine the estimated shift amount to indicate that no shift is to be applied to the difference value.

Accordingly, the computation circuitry is arranged such that if the exponent value is already the minimum exponent value for a normal floating-point value, then the most significant bit position in the second bit string will be set to prevent any shifting of the difference value. Similarly, the computation circuitry will ensure that the most significant bit position in the second bit string is set if the exponent value is already a reserved exponent value used for subnormal floating-point values since again no shift should be applied to the difference value.

In one embodiment, the exponent value is expressed as a biased exponent value, and the computation circuitry is arranged to set a most significant bit position in the second bit string to identify the shift limit bit position when the biased exponent value is 1 or 0. Hence, in such embodiments, the biased exponents of 1 and 0 both refer to the same minimum exponent value, with a biased exponent of 1 meaning that the minimum exponent value is associated with a normalised significand (i.e. a significand of the form 1.xxxxx), whereas a biased exponent of 0 indicates that the minimum exponent value is associated with an unnormalised significand of the form 0.xxxxx.

In one particular embodiment, the functionality required within the computation circuitry to enable the most significant position in the second bit string to be set when the biased exponent value is 1 or 0 is achieved by arranging the associated computation for the most significant bit position to ignore the value of bit 0 of the exponent value, hence making no distinction between a logic 0 value or a logic 1 value in that least significant bit position of the exponent value.

In one embodiment, the apparatus further comprises subnormal condition detection circuitry to determine when the estimated shift amount is constrained by the shift limit bit position, rather than the most significant bit position with the difference value that is predicted to have its bit set to a determined value, and on such detection to issue a signal to cause a result exponent to be set to a reserved exponent value used for a subnormal floating-point value. It can be beneficial to generate this trigger signal from analysis of the first and second bit strings produced by the shift estimation circuitry, since if it is known that the shift limit bit position encoded within the second bit string is going to constrain the estimated shift amount, it is also known that the shifted difference value will be in the subnormal range, and accordingly the exponent should be set to the reserved exponent value, i.e. the value of 0 in the above mentioned example of biased exponents.

Particular embodiments will now be described with reference to the Figures.

Floating-point (FP) is a useful way of approximating real numbers using a small number of bits. The IEEE 754-2008 FP standard proposes multiple different formats for FP numbers, some of which are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

| Format | Sign | Exponent | Fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1.\text{fraction} \times 2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| Sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 1^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software. Some processors handle subnormals in hardware, speeding up these operations by a factor of 10 to 100 compared to a software or microcode implementation.

The embodiments described herein provide an efficient mechanism for estimating a shift amount to be applied to a difference value obtained by subtracting the significands of two floating-point operands. As mentioned earlier, a known LZA circuit can seek to predict how many leading zeros there will be in the difference value, based on analysis of the significands, with that leading zero information being used to determine a left shift to apply to the difference value in order to seek to normalise the difference.

When subtracting two significands, it is likely that the resultant difference value will represent a number less than 1.0, and accordingly will need to be normalised by performing a left shift operation. However, normalisation for numbers less than 1.0 requires that the exponent be decremented to compensate for the adjustment being made to the difference value. Consider the following example:

```
  1_0000_0000
 −0_1111_0000
 ────────────
  0_0001_0000
```

There are 4 leading zeros, and so we need to left shift by 4 bit positions in order to normalise. However note that $$0.0001 * 2^e = 0.0010 * 2^{(e-1)}$$

(or for example $0.1 * 2^2 = \tfrac{1}{2}$ of $4 = 2 = 1.0 * 2^1$)

The problem comes when the exponent e is near the minimum exponent (biased exponents zero and one are both the same minimum exponent in IEEE 754 formats). We cannot left shift and decrement these exponents.

So a result with a biased exponent of zero or one cannot be left shifted at all. A result with a biased exponent of two can be left shifted at most one bit position. A result with a biased exponent of j>1 can be left shifted at most j−1 bit positions.

Accordingly, whilst a standard LZA circuit can determine, from analysis of the two input significands, an estimate of the left shift required to normalise the result, that left shift amount needs to be qualified so that a left shift will not be applied that results in the exponent being decremented below the minimum value. Hence, the normalisation problem is to left shift by:

$$\min(LZA, e-e_{min}).$$

However, to determine $e-e_{min}$ requires performance of a subtraction operation, and this can significantly impact on the performance of the LZA computation. It is also often the case that $e-e_{min}$ cannot be computed early enough, compared with the time at which the standard LZA computation based on the significands can be performed, further impacting the performance.

The embodiments described herein provide a mechanism for qualifying the left shift amount produced by a standard LZA analysis, without needing to directly compute the difference $e-e_{min}$. Further, the mechanisms described for determining whether the exponent will limit the left shift use simple logical operations performed on bits of the exponent value, and do not require any time intensive computations such as shifting operations. Indeed, in the particular embodiments described the circuitry used to determine whether the exponent value will limit the left shift has a logic depth no greater than the logic depth used to create a bit string from analysis of the two input significands during a standard LZA computation, and hence by the time that bit string has been computed, the information necessary to determine whether the exponent value will limit the left shift is also available. This provides a particularly efficient implementation.

Figure 1:
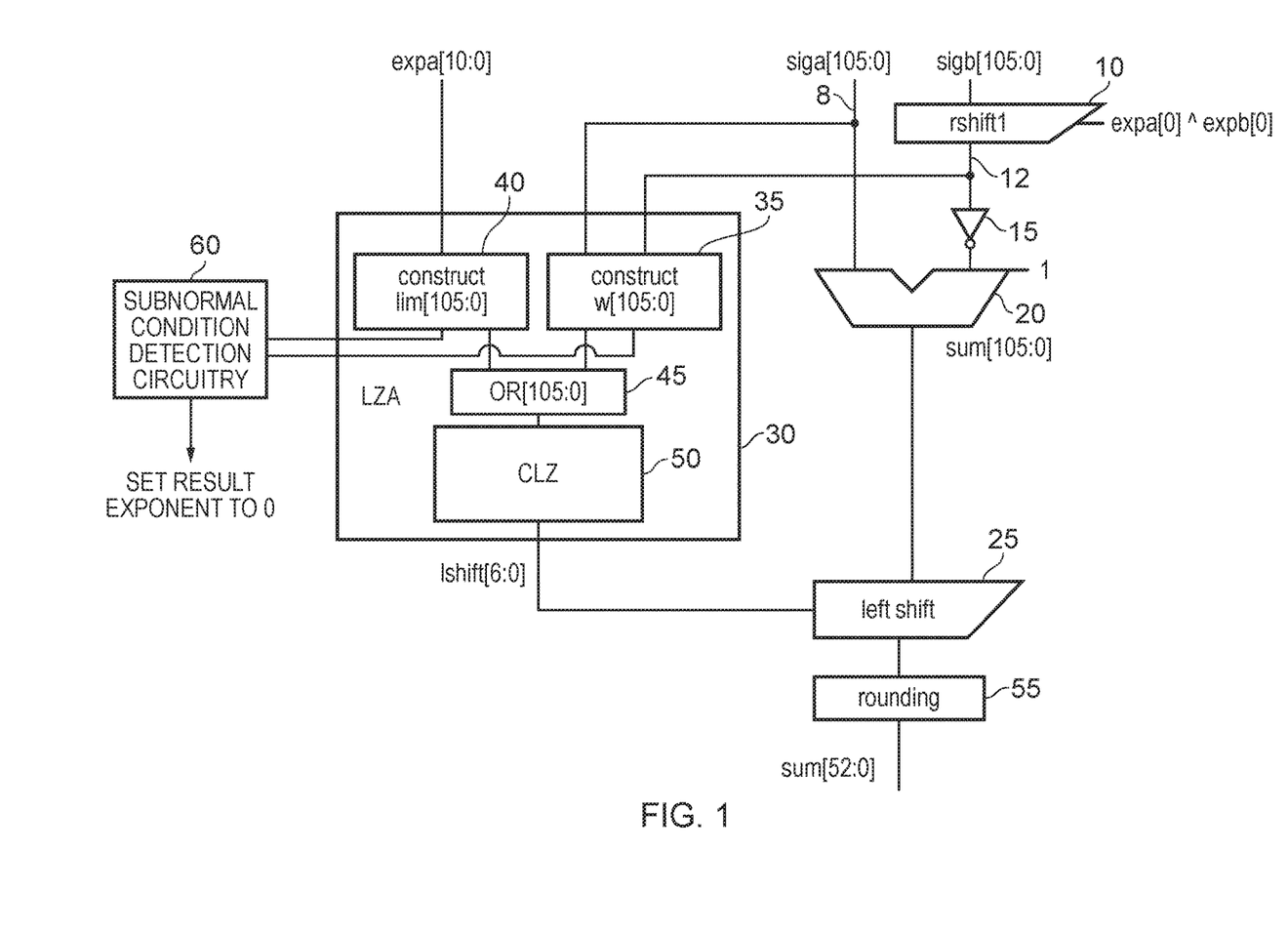
FIG. 1 is a diagram illustrating an apparatus in accordance with one embodiment.

FIG. 1 is a diagram illustrating an apparatus in accordance with one embodiment. In this example, it is assumed that double precision floating-point numbers are being operated on. Further, the significand paths for the two input significands are 106 bits in size, which allows for either operand to represent an unrounded product of two double precision numbers. In accordance with the double precision format, the exponent value comprises 11 bits.

In one embodiment, the circuitry shown in FIG. 1 exists within near path processing circuitry, and is used to compute a difference between two input floating-point operands when those two input floating-point operands have exponents that are either equal, or differ at most by one. When that condition is not met, the difference computation will instead be performed within a far path processing circuit, using any of a number of known standard techniques.

As shown, a right shift by one block 10 is provided, which right shifts the significand b by one bit, if bit zero of the exponent value of each input floating-point operand are not the same, hence indicating that the exponents differ by one. In one embodiment, by the time the two significand inputs siga and sigb are provided to the circuitry shown in FIG. 1, it is known that siga has the larger or same exponent as sigb, and hence if in fact the exponent values are different by one, it is sigb that needs to be right shifted. In an alternative embodiment, that evaluation can be made later, and the apparatus may be arranged to perform two separate computations, one subtracting the second operand from the first operand, and the other subtracting the first operand from the second operand, with the decision being taken later as to which, if any, is the correct result, based on a later determination as to which operand had the larger exponent. As mentioned earlier, if the exponents differ by two or more, the result used is actually one produced by different logic circuits.

For the purposes of the following discussion, the significand value received over path 8 will be referred to as the first significand, and the significand value output over path 12 (which has optionally been subjected to a right shift by one bit by the shifter 10) will be referred to as the second significand, and the circuitry 15, 20 is used to subtract the second significand from the first significand. In particular, twos-complement addition is performed using the adder circuitry 20, with the bits of the second significand being inverted by the inverter 15, and with the adder receiving a carry in value of 1. Accordingly, the sum output from the adder 20 represents a difference value obtained by subtracting the second significand from the first significand. That value is then subjected to a left shift operation by the shift circuitry 25, with the amount of the left shift being determined by the modified LZA circuitry 30 shown in FIG. 1.

The modified LZA circuit 30 includes two bit string construction blocks 35, 40. A first bit string is produced by the construct w block 35, this block receiving the first and second significands, and performing an analysis of those significands in order to produce an estimate of the number of leading zeros that will be present within the difference value. Any standard LZA circuitry can be used to implement the construct w block 35. As will be appreciated by those skilled in the art, the output from the construct w block 35 will be a first bit string where the most significant logic one value is in the bit position where it is anticipated that there will be a leading one in the difference value computed by the adder 20. This prediction performed by the construct w block 35 will in one embodiment at most be out by one bit position, due to the potential for a carry-out from low order bits. In the standard manner, it can later be determined if that prediction was out by one bit position, with a subsequent adjustment being made later within the processing path (not shown in FIG. 1).

As also shown in FIG. 1, a construct lim block 40 is provided that operates in parallel with the construct w block 35, and generates a second bit string used to identify a shift limit bit position, based on evaluation of the exponent. In particular, the expa value provided to the construct lim block 40 represents an exponent value that is common to the first and second significands, and based on that common exponent value, the construct lim block 40 is arranged to generate the second bit string based purely on simple logical operations applied to the sequence of bits of the exponent value. In particular, as will be discussed in more detail later, for each bit position that can be associated with a possible left shift amount of the difference value, an associated computation is performed using the bits of the exponent value to determine a value for that bit position. In one embodiment, each bit of the exponent value is used at most once during the computation associated with any particular bit position within the second bit string.

In the example shown in FIG. 1, it is assumed that a 106-bit second bit string (and a corresponding 106-bit first bit string) is generated, so that the number of bits in each bit string match the number of bits in the difference value produced by the adder circuitry 20, and accordingly both bit strings include information associated with each possible left shift amount of the difference value. In such an arrangement, within the construct lim block 40, a separate computation will be performed for each of the 106 bit positions in the second bit string. For each bit position, the computation performed may be different to the computation performed for any other bit position, but each computation will involve simple logical operations performed using bits of the exponent value, in one embodiment the logical operations comprising one or more of AND, OR and NOT operations.

Due to the simple logical operations performed by the construct lim block 40, and the fact that those logical operations operate directly on the bits of the exponent value, the second bit string can be generated relatively quickly, and in one embodiment the logic depth of the construct lim block 40 circuitry is no greater than the logic depth of the construct w block circuitry 35. In particular, by arranging the construct limit block 40 to perform a simple sequence of logical operations for each bit position in the bit string, directly using bits of the exponent value, there is no need for any time intensive subtraction or shifting operations to be performed, and this enables the second bit string to be generated at least as quickly as the first bit string.

The two bit strings are then provided to the combining circuitry 45, which in one embodiment performs a simple OR operation on the two input bit strings in order to generate a combined bit string that is then output to the count leading zeros (CLZ) circuit 50. The CLZ circuit 50 can operate in the standard manner, but rather than operating directly on the output of the construct w block 35, it now uses the combined bit string produced by the combining circuitry 45, and counts the number of leading zeros in the combined bit string in order to determined a left shift amount, which is then encoded in a seven bit value output to the left shift circuitry 25. It will be appreciated that since the maximum left shift amount is 106 bits, all possible left shift amounts can be encoded within a seven bit left shift value output by the CLZ circuit 50.

The difference value is then subjected to a left shift by the left shift circuitry 25 under the control of the left shift indication from the CLZ circuit 50, whereafter the output is passed to rounding circuitry 55, where a rounding operation is performed to produce an output significand value comprising 53 bits, consistent with the standard format for double precision significands.

By arranging the circuitry to operate as shown in FIG. 1, this provides a highly efficient mechanism for qualifying the left shift amount produced from an analysis of the two input significands, so as to ensure that a left shift is not applied that exceeds the maximum left shift appropriate having regard to the exponent value. In particular, it will be appreciated that if the second bit string output by the construct lim block 40 has a most significant one at a more significant bit position than the most significant one in the first bit string produced by the construct w block 35, then after the two bit strings have been combined, the number of leading zeros detected by the CLZ circuit 50 will be determined by the leading one in the second bit string produced by the construct lim block 40, hence producing a lower left shift amount than would have been the case had the output from the construct w block 35 been analysed directly by the CLZ circuitry 50.

In one embodiment, the computation circuitry associated with the most significant bit position of the 106-bit second bit string is arranged to set that most significant bit to a logic one value when the exponent value is either the minimum exponent value for a normal floating-point value or a reserved exponent value used for a subnormal floating-point value. Hence, in accordance with the IEEE 754 formats discussed above, if the biased exponent is one or zero, the most significant bit in the second bit string will be set. It will be appreciated that this will mean that the CLZ circuit 50 will not detect any leading zeros and no left shift will be applied. Hence, the circuitry can automatically take into account the fact that a biased exponent of one or a biased exponent of zero actually refer to the same minimum exponent value, and hence prevents any left shifting if the biased exponent is either one or zero.

It is also useful to be able to determine whether the left shift has been constrained by the second bit string or not. In particular, if the most significant 1 in the second bit string is in the same bit position as the most significant 1 in the first bit string, this will indicate that the left shift amount indicated by the first bit string is allowed to be performed, but will result in the exponent then taking on the minimum exponent value for a normal floating-point value, i.e. a biased exponent value of one. However, if instead the left shift amount is limited by the most significant one in the second bit string, this indicates that the difference value will be subjected to a left shift that is insufficient to enable it to be fully normalised (i.e. converted into a significand of the form 1.xxx) and accordingly this means that the associated biased exponent should have a value of zero, indicating that the result is a subnormal result.

In one embodiment, subnormal condition detection circuitry 60 is provided which can make this determination based on analysis of the first and second bit strings output by the construct w block 35 and construct lim block 40, respectively. In particular, when the subnormal condition detection circuitry 60 detects that the second bit string will limit the left shift amount, it sets an output that is forwarded to exponent handling circuitry (not shown in FIG. 1) to cause the result exponent to be set to a biased exponent of zero, to identify a subnormal result.

With regard to the timing impact of the modified LZA circuitry 30 shown in FIG. 1, by computing the value for each bit of the second bit string directly from the eleven bits of the exponent value, it has been found that this computation can be done with a logic depth of about five 2-input gates. In practice, this turns out to represent a slightly lower logic depth than the logic depth required by the construct w block 35. Accordingly, the only additional delay relative to the CLZ circuitry 50 directly using the output from the construct w block 35 is the 2-input OR gate that combines the first and second bit strings. However, as discussed above, the modified LZA circuitry 30 is able to automatically qualify the output from the construct w block 35 so as to prevent a left shift being applied that would require the exponent to be decremented below the minimum allowed value, hence avoiding the need for any further steps to be taken to achieve that qualification.

Figure 2:
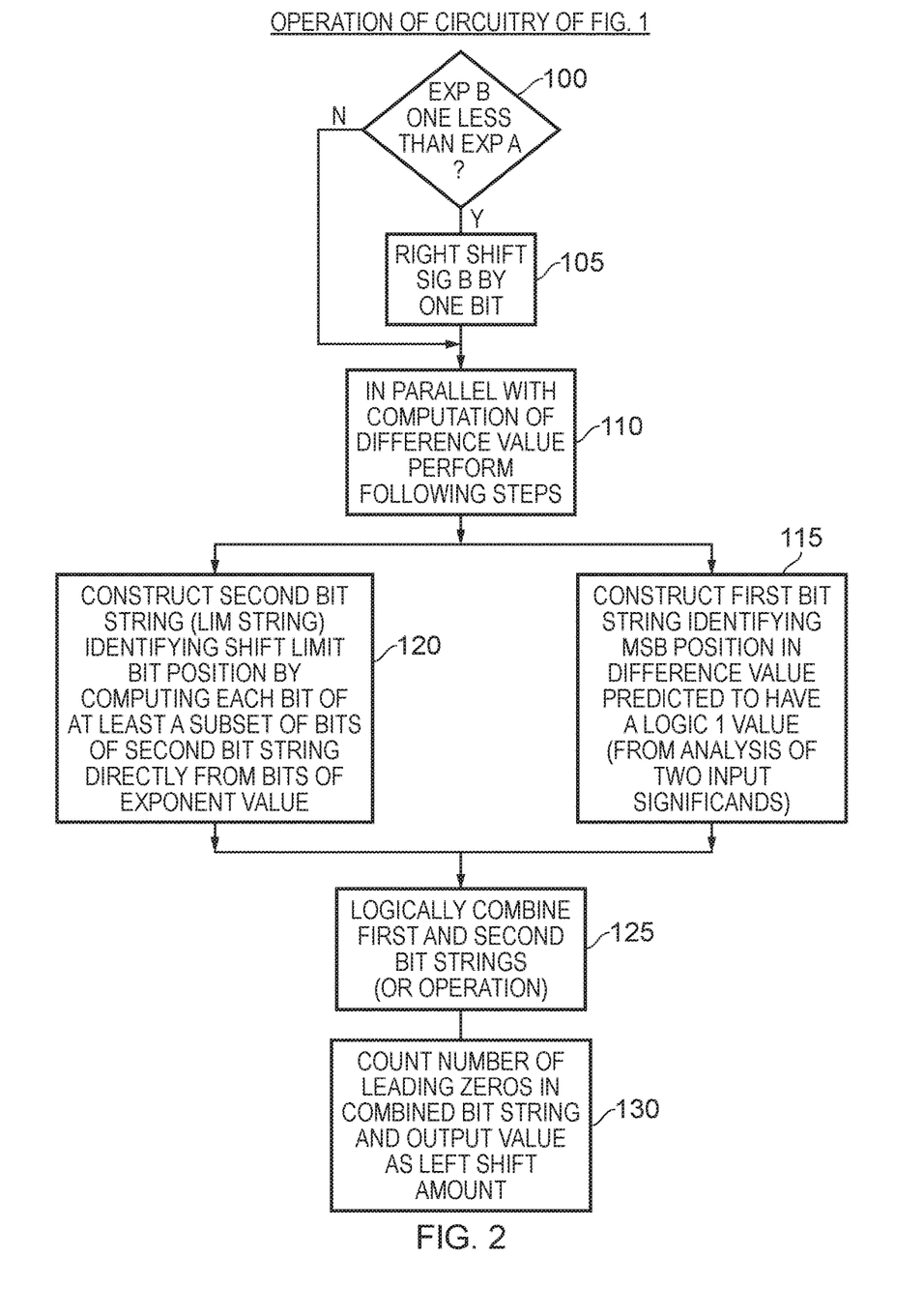
FIG. 2 is a flow diagram illustrating the operation of the apparatus of FIG. 1 in accordance with one embodiment.

FIG. 2 is a flow diagram illustrating the operation of the circuitry of FIG. 1. At step 100, it is determined whether the exponent of operand b is one less than the exponent of operand a, and if so significand b is right shifted by one bit at step 105, using the shift circuitry 10. As discussed earlier, at step 100, it may merely be assumed that exponent b is one less than exponent a if bit zero of the two exponents are different, with it later being determined whether it was in fact the case that exponent b was one less than exponent a. In such circumstances, the circuitry of FIG. 1 may be used twice to perform two different computations, the first being opa−opb, and the second being opb−opa, with the appropriate result then being later selected dependent on a subsequent determination as to which operand had the lower value exponent. As also mentioned earlier, it may also be the case that the exponent difference is two or more, in which case other circuitry will be used to perform the subtraction of the floating-point operands.

As indicated by step 110, in parallel with the computation of the difference value by the circuitry 20, the following steps 115 and 120 are performed in parallel. In particular, at step 115, a first bit string is constructed by the block 35 to identify the most significant bit position in the difference value that is predicted to have a logic one value, this being performed directly from analysis of the two input significands.

In parallel, at step 120, the block 40 is used to construct a second bit string (also referred to herein as the lim string) identifying a shift limit bit position by computing a value for each bit of at least a subset of bits of the second bit string directly from the bits of the exponent value. In the example shown in FIG. 1, it is assumed that the two bit strings produced have an identical number of bits to the number of bits in the difference value, and accordingly in that case when generating the second bit string a computation is performed for each bit position within the lim string. However, in some embodiments it may simplify the implementation to operate on values that have a number of bits that is a power of two. Accordingly, it may be arranged that each of the blocks 35, 40 produce a 128-bit string. In that case, the most significant 106 bits in the string may be computed by the relevant blocks, with the remaining 22 least significant bits merely being padding bits, and set to a predetermined value, for example a logic zero value. The extension of the bits strings to 128 bits by adding 22 least significant bits all set to zero has no effect on the computation performed by the CLZ block 50, which is counting the number of leading zeros (i.e. starting from the most significant bit position), and accordingly does not affect the left shift amount used to control the left shift circuitry 25. Following steps 115 and 120, the first and second bit strings are logically combined at step 125, in one embodiment by performing an OR operation. Thereafter, at step 130, the number of leading zeros in the combined bit string is counted, in order to determine the left shift amount, and a corresponding output value is issued to the left shift circuitry 25 to identify that left shift amount.

Figure 3:
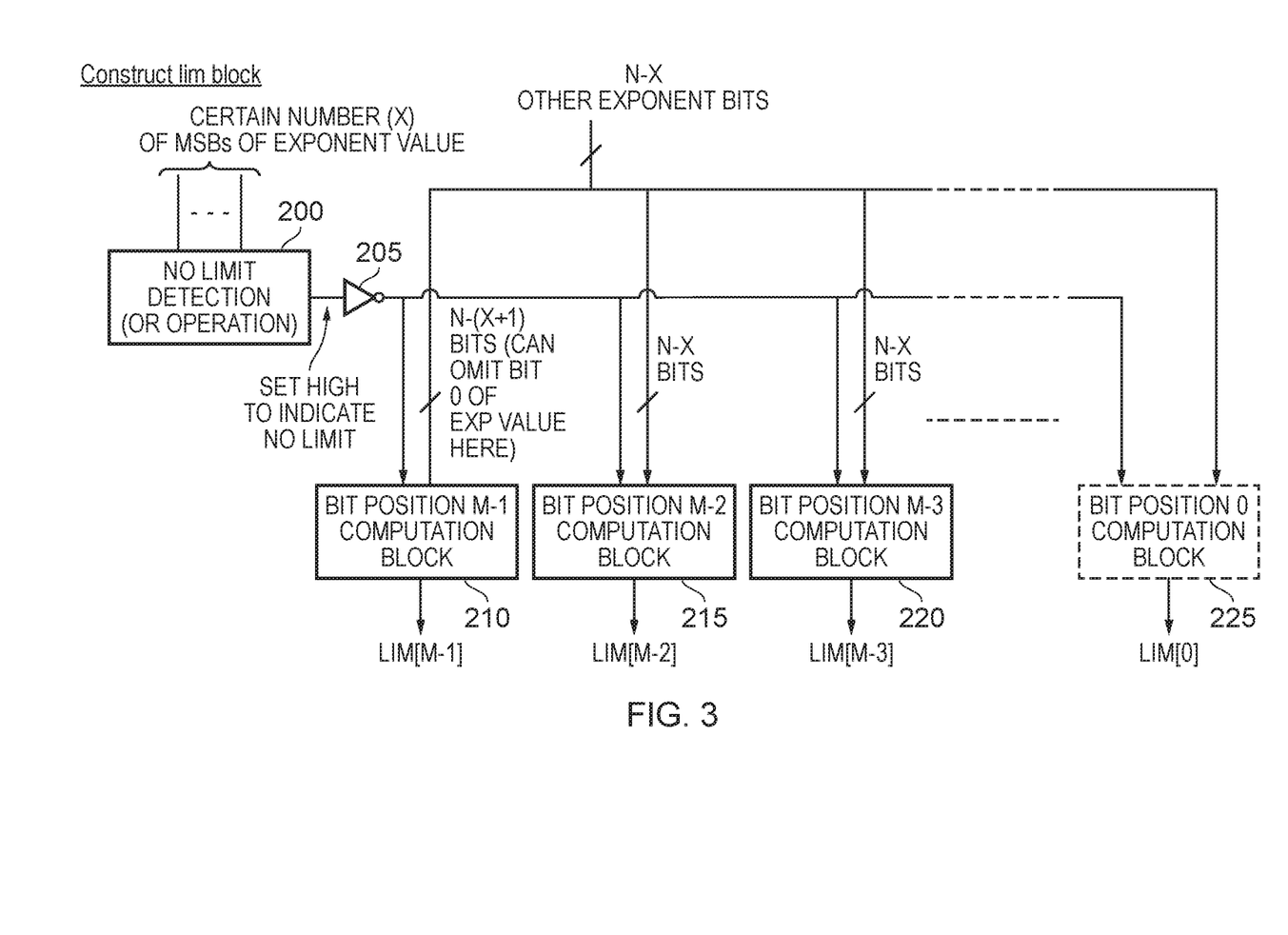
FIG. 3 is a block diagram illustrating components provided within the construct limit block 40 of FIG. 1 in accordance with one embodiment.

FIG. 3 is a block diagram illustrating components provided within the construct lim block 40 in accordance with one embodiment. In this example, it is assumed that the exponent value has sufficient bits that there are at least a subset of possible exponent values that will be large enough to never require any limit to be placed on the left shift amount determined from the significands. Hence, a certain number of most significant bits of the exponent value (referred to as the most significant X bits in FIG. 3) can be provided to no limit detection circuitry 200. In one embodiment, the no limit detection circuitry can perform a simple OR operation on those most significant bits, such that if any of those most significant bits are set, a logic one value is output by the no limit detection circuitry 200. This value is then in one embodiment inverted by the inverter 205, and provided as an input to each of the separate computation blocks associated with corresponding bit positions in the second bit string. The remaining exponent bits (referred to in FIG. 3 as the N-X bits assuming the exponent has N bits in total) are then also provided to the individual computation blocks 210, 215, 220, 225. As discussed earlier, in one embodiment bit zero of the exponent value can be omitted from the bits provided to the computation block 210 associated with the most significant bit position of the lim string. In this example, it is assumed that an M-bit lim string is produced, and accordingly block 210 is associated with the most significant bit position. By omitting the least significant bit of the exponent value from the inputs to the computation block 210, the computation block can detect situations where all of the other exponent bits are zero, indicating that the biased exponent is either one or zero, and in that case will set bit lim[M−1] to one. In due course, this will result in the CLZ circuit 50 detecting no leading zeros, and accordingly applying no left shift.

Within each of the computation blocks 210, 215, 220, 225, simple logical operations can be applied to the sequence of exponent bits to produce a corresponding output bit for the associated LIM bit position. The actual computations performed will depend on the size of the difference value and the number of bits in the exponent value.

If the number of bits M in the lim bit string is equal to the number of bits in the difference value computed by the sum block 20, then a corresponding computation block will be provided for every bit position. However, if the lim string is padded in the manner discussed earlier, so as for example to ensure that the lim string has a number of bits that are equal to a power of two, then one or more of the lower significant bits may not need any explicit computation block, and accordingly to illustrate that point the computation block 225 is identified by a dotted box in FIG. 3. In particular, as discussed earlier, a certain number of least significant bits of the lim string may all be set to zero if the lim string is padded in that manner. For example, for double precision numbers where the difference may represent 106 bits, the lim string may be padded so as to be a 128-bit number. Similarly, for single precision operands, the difference value may be 48 bits, and the lim bit string may be padded to produce a 64-bit bit string. Further, for half precision operands, where the difference value may be 22 bits, the lim bit string may be padded to form a 32-bit value. Since the difference is padded on the right, i.e. in a certain number of least significant bit positions, any exponent limit indication in that padded range is not going to affect the left shift computed by the CLZ circuit 50, and accordingly those padded bit positions can have their value set to any arbitrary value.

Figure 4:
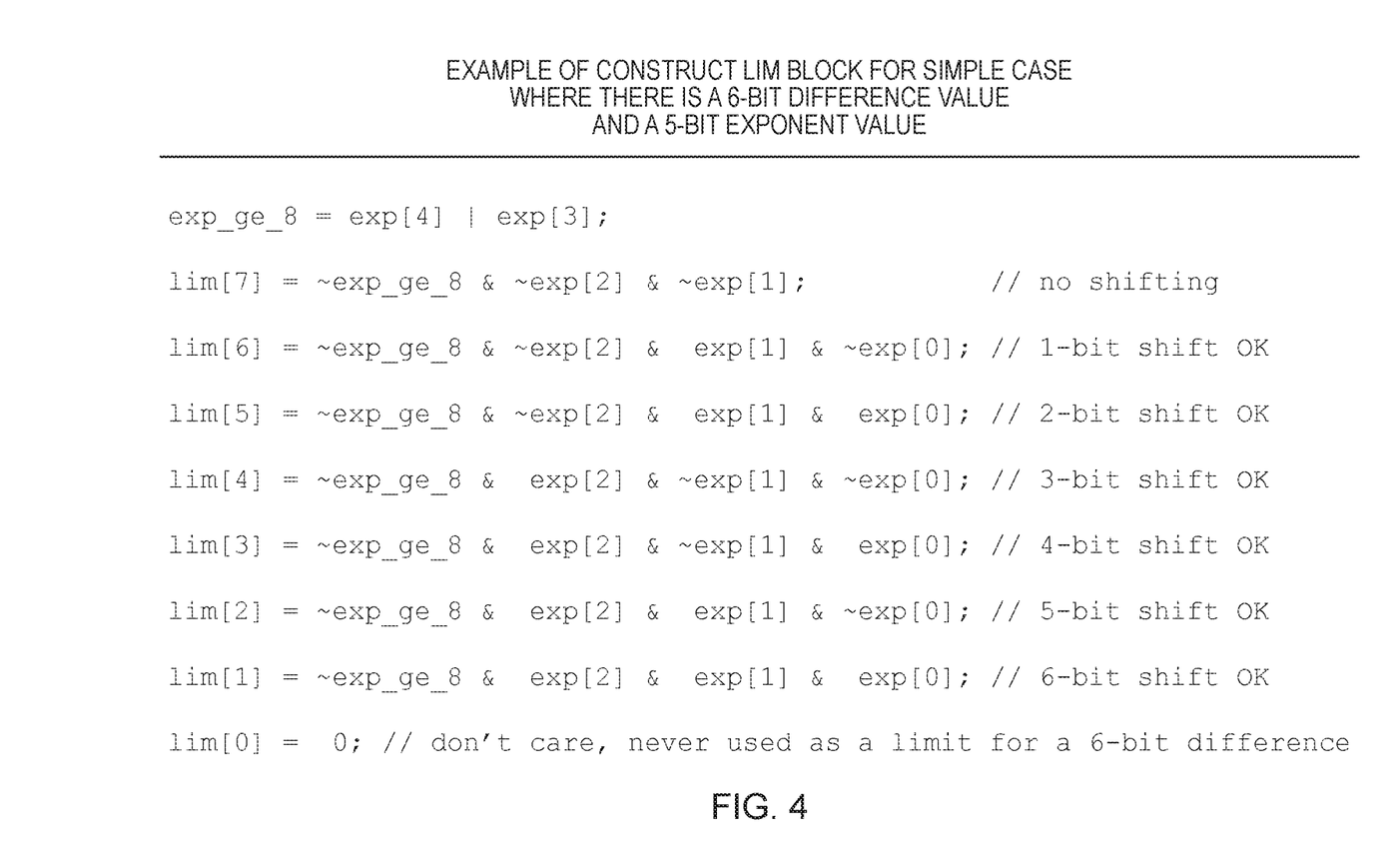
FIG. 4 is a diagram illustrating the operation of the components shown in FIG. 3 for a specific example scenario.

FIG. 4 schematically illustrates the computations that may be performed by the components shown in FIG. 3 for a specific example where the difference value is a 6-bit difference value, and the exponent value is a 5-bit exponent value. Since the difference value is 6-bits, and hence the maximum left shift is 6-bits, if either of the most significant two bits of the exponent are set to a logic one value, this will indicate that the exponent value is large enough that it will not place any limit on the maximum left shift available. Accordingly, the no limit detection circuitry 200 can receive exponent bits 4 and 3, and perform a logical OR operation on those exponent values in order to generate the no limit signal, referred to in FIG. 4 as "exp_ge_8". That value will hence be set to a logic one value if either bit 4 or bit 3 of the exponent are set, and as shown in the remainder of FIG. 4 the inverted version of that no limit signal is then provided to each of the computation circuits associated with each bit position of the lim bit string. In this example an 8-bit lim bit string is produced so as to produce a lim bit string whose number of bits are a power of two. The most significant bit position computation block (computation block 210 in FIG. 3) produces the lim[7] value by performing logical AND operations using the inverted version of the no limit signal output by the inverter 205, and inverted values of exponent bits 2 and 1, lim[7] will hence be set to a logic one value if all of the exponent values 4 to 1 are logic zero values, but if any of those bits are set to logic one values, lim[7] will be set to zero. When lim[7] is set to one, this will indicate that no shifting is allowed, and from the earlier discussion of FIG. 1 it will be appreciated that in that instance the CLZ circuit 50 will determine there are no leading zeros in the combined bit string produced by the combining circuitry 45.

For each of the other lim bit positions, it will be seen that all of the exponent bits are used once. The lim[6] signal will be set to one if bit 1 of the exponent value is set to one and all of the other exponent bits are set to zero. Hence, in this example the exponent has a value of two, and accordingly a 1-bit shift is allowed.

The computations performed by each of the other computation blocks associated with the various bit positions of the lim bit string are also set out in FIG. 4. In each case, it can be seen that if the exponent value has a value j that is greater than 1, then the shift limit bit position will be set to identify that a left shift of a most j−1 bit positions can be performed.

As shown in FIG. 4, no computation is required for lim[0] and that output can be set to an arbitrary value, as it will never be used as a limit for a 6-bit difference.

From the above described embodiments, it will be appreciated that those embodiments allow for the construction of a left-shift limiting string directly from the biased exponent, and correctly accounting for the minimum exponent value and for the normal/subnormal boundary. That left-shift limiting string can be constructed quickly by performing, for each active bit position (i.e. a bit position corresponding to a possible left shift amount), a computation requiring only simple logical operations applied to the various bits of the exponent value, hence allowing a very efficient mechanism for qualifying the left shift amount indicated from a comparison of the two input significands. No separate subtraction operation is required to compute $e-e_{min}$, and instead the difference is handled implicitly in the logic used to construct the second bit string.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
    processing circuitry to perform a subtraction operation to subtract a second significand value of a second floating-point operand from a first significand value of a first floating-point operand in order to generate a difference value; and
    shift estimation circuitry to determine an estimated shift amount to be applied to the difference value, the shift estimation circuitry comprising:
        significand analysis circuitry to generate, from analysis of the first and second significand values, a first bit string identifying a most significant bit position within the difference value that is predicted to have its bit set to a determined value;
        shift limiting circuitry to generate from an exponent value a second bit string identifying a shift limit bit position, the shift limiting circuitry having computation circuitry to perform, for each bit position in at least a subset of bit positions of the second bit string, an associated computation using bits of the exponent value to determine a value for that bit position within the second bit string, the associated computation being different for different bit positions;
        combining circuitry to generate a combined bit string from the first and second bit strings; and
        shift determination circuitry to determine the estimated shift amount from the combined bit string.

2. An apparatus as claimed in claim 1, wherein, prior to the subtraction operation being performed the first and second floating-point operands are arranged to have an exponent value that is the same, and that exponent value is the exponent value used by the shift limiting circuitry.

3. An apparatus as claimed in claim 1, wherein said at least a subset of bit positions comprises a number of bit positions at least equal to the number of bit positions in the difference value.

4. An apparatus as claimed in claim 1, wherein the associated computation for each bit position in said at least a subset of bit positions of the second bit string is at least logically equivalent to a computation that uses each bit of the exponent value at most once.

5. An apparatus as claimed in claim 4, wherein the associated computation for each bit position in said at least a subset of bit positions of the second bit string performs a sequence of logical operations on the bits of the exponent value.

6. An apparatus as claimed in claim 5, wherein the sequence of logical operations comprises one or more of AND, OR and NOT operations.

7. An apparatus as claimed in claim 1, wherein the significand analysis circuitry and shift limiting circuitry are arranged to operate in parallel.

8. An apparatus as claimed in claim 7, wherein the shift limiting circuitry has a logic depth no greater than the logic depth of the significand analysis circuitry.

9. An apparatus as claimed in claim 1, wherein:
    the significand analysis circuitry is arranged to generate the first bit string such that a bit position within the first bit string is set to a first value to identify said most significant bit position;
    the shift limiting circuitry is arranged to generate the second bit string such that a bit position within the second bit string is set to the first value to identify the shift limit bit position; and
    the shift determination circuitry is arranged to determine the estimated shift amount by detecting a number of leading bit positions within the combined bit string that are set to a second value different to said first value.

10. An apparatus as claimed in claim 9, wherein the shift limiting circuitry is arranged to generate the second bit string such that at most one bit position within the second bit string is set to the first value.

11. An apparatus as claimed in claim 9, wherein said combining circuitry is arranged to perform a logical OR operation on the first and second bit strings to generate the combined bit string.

12. An apparatus as claimed in claim 9, wherein said first value is a logic 1 value and said second value is a logic 0 value.

13. An apparatus as claimed in claim 1, wherein said determined value is a logic 1 value.

14. An apparatus as claimed in claim 1, wherein:
    said computation circuitry includes no limit detection circuitry to set a no limit flag when the exponent value is large enough to allow it to be adjusted by an amount sufficient to compensate for a maximum possible shift amount for the difference value; and
    the computation circuitry is arranged, when the no limit flag is set, to generate a default bit sequence for the second bit string that identifies absence of the shift limit bit position.

15. An apparatus as claimed in claim 14, wherein the no limit detection circuitry performs a logical OR operation on a number of most significant bits of the exponent value, the number of most significant bits being dependent on a number of bits used to specify the exponent value and the maximum possible shift amount.

16. An apparatus as claimed in claim 14, wherein the default bit sequence is an all zeros bit sequence.

17. An apparatus as claimed in claim 1, wherein:
the computation circuitry is arranged to set a most significant bit position in the second bit string to identify the shift limit bit position when the exponent value is one of a minimum exponent value for a normal floating-point value and a reserved exponent value used for a subnormal floating-point value, setting of the most significant bit position in the second bit string causing the shift determination circuitry to determine the estimated shift amount to indicate that no shift is to be applied to the difference value.

18. An apparatus as claimed in claim 17, wherein the exponent value is expressed as a biased exponent value, and the computation circuitry is arranged to set a most significant bit position in the second bit string to identify the shift limit bit position when the biased exponent value is 1 or 0.

19. An apparatus as claimed in claim 1, further comprising subnormal condition detection circuitry to determine when the estimated shift amount is constrained by the shift limit bit position, rather than the most significant bit position with the difference value that is predicted to have its bit set to a determined value, and on such detection to issue a signal to cause a result exponent to be set to a reserved exponent value used for a subnormal floating-point value.

* * * * *